(No Model.)
G. BEEKMAN.
PROPELLING AND BRAKING MECHANISM FOR CYCLES.
No. 592,230.  Patented Oct. 26, 1897.
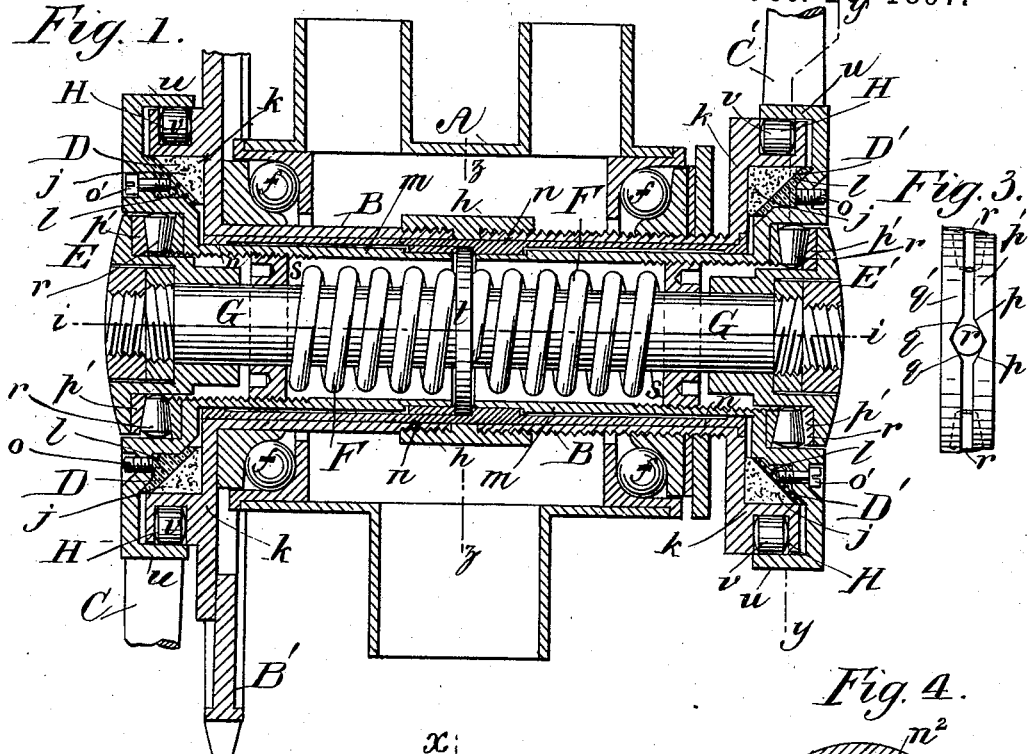
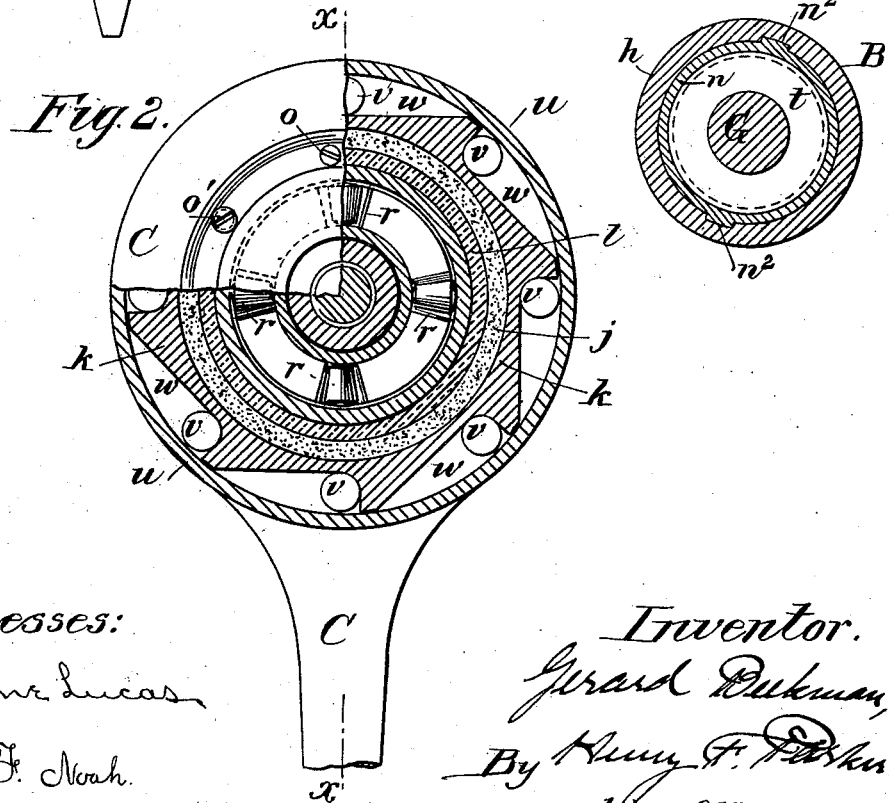
Witnesses:
Eugene Lucas
Harry F. Noah
Inventor.
Gerard Beekman,
By Henry F. Parker.
his Attorney
THE NORRIS PETERS CO., PHOTO-LITHO., WASHINGTON, D. C.

UNITED STATES PATENT OFFICE.

GERARD BEEKMAN, OF NEW YORK, N. Y.

PROPELLING AND BRAKING MECHANISM FOR CYCLES.

SPECIFICATION forming part of Letters Patent No. 592,230, dated October 26, 1897.

Application filed March 5, 1897. Serial No. 626,040. (No model.)

*To all whom it may concern:*

Be it known that I, GERARD BEEKMAN, a citizen of the United States, and a resident of New York city, in the county of New York and State of New York, have invented certain new and useful Improvements in Propelling and Braking Mechanism for Cycles, of which the following is a specification.

My invention relates to improvements in bicycle propelling mechanism shown and described in my separate application filed February 4, 1897, Serial No. 621,945, wherein the motion of the pedal-cranks is imparted to the sprocket-wheel or other driven element by means of an automatic clutch mechanism in which the clutch action is produced intermittently by the pressure or impulses of the rider's feet upon the pedals, and in which coasting, braking, or back-pedaling, as well as propelling, may each be effected according to the manner of moving or arresting the pedal-cranks and without requiring the feet to be removed from them.

The object of the invention is to further provide a simple, effective, and durable means of producing the clutch action by the pressure of the feet on the pedals and to obtain positive propulsion and controllable brake-pressure in the clutch action, and to provide a self-contained and neat-appearing construction.

In my aforesaid application I have shown and described a construction wherein the crank flexure on the axis of rotation is resisted by a torsional spring on said axis, the clutch binding by diametric expansion; and my present improvement consists in clutch mechanism and arrangement of parts wherein the crank flexure on the axis of rotation causes the clutch to bind by a longitudinal movement along the said axis, and the crank flexure is resisted by a longitudinally-compressible spring or equivalent.

Referring to the accompanying drawings, Figure 1 represents a cross-section through the frame of a bicycle, showing the internal construction of the shaft-hanger and the internal construction of the crank-hubs in the line $xx$ of Fig. 2. Fig. 2 is an end elevation, partly in section, at the line $yy$, Fig. 1, showing the internal construction of the crank-hub. Fig. 3 is an edge view showing details of the cam device detached. Fig. 4 is a detail cross-sectional view at $zz$, Fig. 1.

A represents the crank-hanger in the frame of a bicycle.

B represents the rotary driven element, which in the illustration consists of a tubular shaft freely rotative in ball-bearings $ff$. The shaft B is coupled together rigidly by a collar $h$, and one part of the shaft B bears a sprocket drive-wheel B'.

C C' represent the pedal-cranks oppositely disposed on the axis $ii$ of rotation of the same, but having no fixed connection therewith.

D D' represent clutch mechanism, which in the illustration consists of a concave cone $j$ of rawhide or other material fixed in the flange $k$ of the driven part and a convex cone $l$ of metal adjustably fixed in the hub of each crank, the one cone adapted to be thrown into frictional contact with the other. Each crank is movable in the length of its axis to operate the clutches, and the cranks are guided and steadied by inward tubular projections $mm$ thereon, which slide toward or from one another in the sleeve $n$. The sleeve $n$ forms a rotative locking-key for the two parts of the shaft B when screwed into the collar $h$, the longitudinal ribs $n^2$ $n^2$ on the locking-sleeve, Fig. 4, fitting in grooves in each said part and in the collar $h$. The centering-collar $t$ prevents the lateral displacement of the shaft G and limits the lateral action of the tubular projections $mm$, and thus retains the rollers $rr$ within the V-shaped recesses of $pq$. The clutch-cones $l$ have adjusting-screws $o$ arranged in series to set them up against the rawhide and take up wear, and alternate series of screws $o'$ serve to draw back the cone against the screws $o$ when adjusted and to retain the parts together.

E E' are cam devices, the outer members of which are rigidly connected together by means of a shaft G and bear V-shaped recesses having inclined formations $pp$, Fig. 3, on their disks $p'$. The disks $q'$ of the crank-hubs bear corresponding V-shaped recesses having inclined formations $qq$. Cone-rollers $rr$ are interposed between the recesses of the disks and operate to expand the cam device and force the hubs of the cranks inward toward one another, so as to bind the clutch mechanisms D D' when the cranks are rotatively deflected with relation to one another from their normal opposite position on their axis. The clutches are normally free from frictional contact. But a very slight movement is required to operate them and to produce braking contact or release, and a correspondingly slight movement of flexure or deflection of the cranks is therefore sufficient when the convex cone $l$ is properly adjusted by the screws $o$ and $o'$.

F F are springs compressed between the adjustable nuts $s$ $s$ in the crank-sleeves $m$ $m$ and acting as one spring through the medium of the interposed centering-collar $t$, fixed to the shaft G, and said springs tend to release the clutches D D' and to contract the cam-disks $p'$ $q'$ together, centering the recesses $p$ $q$ upon the interposed rollers $r$, therefore supporting the cranks at a normal central position of flexure. By exerting foot-pressure upon the two cranks, tending to rotate them in opposite directions simultaneously, the springs F F, which are stiff enough to resist the ordinary weight of the rider's feet, will yield, allowing the friction devices D D' to bind on the driven part, and when the engagement is once thus initiated the brake-pressure may be applied by the foot to the crank-pedal which happens to be rearmost in the orbit of rotation. By means of this device back-pedaling may also be performed by depressing each pedal alternately as it becomes rearmost in the orbit of rotation.

In order to provide positive clutch engagement for forward propelling motion, I employ in conjunction with the foregoing devices a ball or roller clutch H, comprising a series of rollers $v$, loosely arranged in inclined pockets $w$ in the flanges $k$ of the driven part and engaging with the flanges $u$ of the crank-hubs. The roller-clutch H may be dispensed with, and the bicycle may be propelled forward by the clutches D D', as well as being retarded or backwardly propelled by the latter.

Having thus fully described my invention, what I claim, and desire to secure by Letters Patent, is—

1. In a cycle, the combination with a suitable supporting-frame and a rotary driven element mounted therein, of two oppositely-disposed pedal-cranks mounted within said driven element upon shaft-sections having a limited rotative and longitudinal movement relative to each other, mechanism for converting the opposed rotative movement of said shaft-sections in either relative direction from a normal intermediate position into an opposed longitudinal movement thereof in one given direction, and frictional contact-surfaces upon said shaft-sections adapted to engage with frictional contact-surfaces upon said driven element by said opposed longitudinal movement of the sections, and elastic means tending to resist said opposed movements and to maintain the cranks in their normal opposite relation.

2. In a cycle, the combination with a crank-hanger and a rotary tubular driven shaft therein, of two oppositely-disposed pedal-cranks mounted upon shaft-sections having a limited rotative and longitudinal movement relative to each other within said tubular driven shaft, mechanism for converting the opposed rotative movement of said shaft-sections in either relative direction from a normal intermediate position into an opposed longitudinal movement thereof in one given direction consisting in two disks facing the outer extremities of said sections and rigidly connected together by a rod extending through said sections and having V-shaped recesses and corresponding V-shaped recesses in the outer extremities of the said shaft-sections and rollers interposed in said recesses, frictional contact-surfaces upon said shaft-sections adapted to engage with frictional contact-surfaces upon said driven shaft by said opposed longitudinal movement of the sections, and a spring or springs tending to press the sections outwardly against said disks.

3. In a cycle, the combination with a crank-hanger and a rotary tubular driven shaft therein, of two oppositely-disposed pedal-cranks mounted upon shaft-sections having a limited rotative and longitudinal movement relative to each other within said tubular driven shaft, mechanism for converting the opposed rotative movement of said shaft-sections in either relative direction from a normal intermediate position into an opposed longitudinal movement thereof in one given direction consisting in two disks facing the outer extremities of said sections and rigidly connected together by a rod extending through said sections and having V-shaped recesses and corresponding V-shaped recesses in the outer extremities of the said shaft-sections and rollers interposed in said recesses, frictional contact-surfaces upon said shaft-sections adapted to engage with frictional contact-surfaces upon said driven element by said opposed longitudinal movement of the sections, and a spring or springs tending to press the sections outwardly against said disks, and a positive clutch mechanism engaging said cranks with said driven element for a given direction of rotation.

Signed at New York city, in the county of New York and State of New York, this 4th day of March, A. D. 1897.

GERARD BEEKMAN.

Witnesses:
CHARLES E. FRANCIS,
EUGENE LUCAS.